United States Patent [19]
Dies et al.

[11] Patent Number: 5,645,299
[45] Date of Patent: Jul. 8, 1997

[54] STEERING COLUMN SUPPORT

[75] Inventors: Gary L. Dies; Mark A. Cartwright, both of Lafayette; Jonathan A. Lewis, Kokomo, all of Ind.

[73] Assignee: TRW Inc., Lyndhurst, Ohio

[21] Appl. No.: 656,066

[22] Filed: May 31, 1996

[51] Int. Cl.$^6$ .................................................. B62D 1/16
[52] U.S. Cl. .............................................. 280/779; 74/492
[58] Field of Search ............................ 280/779, 775, 280/780; 74/492

[56] References Cited

U.S. PATENT DOCUMENTS

| | | |
|---|---|---|
| 2,903,904 | 9/1959 | Mackie . |
| 3,945,662 | 3/1976 | Murase et al. . |
| 5,090,730 | 2/1992 | DuRocher et al. ................. 280/715 |
| 5,180,189 | 1/1993 | Moreno ............................. 280/229 |
| 5,282,394 | 2/1994 | Dominique et al. . |
| 5,294,149 | 3/1994 | Haldric et al. ..................... 280/775 |
| 5,339,706 | 8/1994 | Freeman . |

*Primary Examiner*—Christopher P. Ellis
*Attorney, Agent, or Firm*—Tarolli, Sundheim, Covell, Tummino & Szabo

[57] ABSTRACT

A steering column support for mounting a steering column in a vehicle comprises a mounting plate having a first surface for engaging the vehicle and a channel for receiving the steering column located on a side opposite from the first surface. The mounting plate is connectable in any one of a plurality of positions along an axis of the steering column. The mounting plate further includes slots located on opposite sides of the channel for receiving fasteners for connecting the mounting plate to the vehicle.

10 Claims, 2 Drawing Sheets

STEERING COLUMN SUPPORT

BACKGROUND OF THE INVENTION

The present invention relates to a steering column, and more specifically to a support for mounting a steering column in a vehicle.

Known steering column supports are designed for mounting a specific steering column in a specific vehicle. Therefore, for each vehicle and each steering column a new support must be designed. Accordingly, the need exists for a steering column support adapted to mount a number of different steering columns into a number of different vehicles.

SUMMARY OF THE INVENTION

A steering column support for mounting a steering column in a vehicle comprises a mounting plate having first surface means for engaging the vehicle and second surface means for defining a channel for receiving the steering column. The first and second surface means are located on opposite sides of the mounting plate. The mounting plate is connectable in any one of a plurality of positions along an axis of the steering column. The mounting plate further includes slots located on opposite sides of the channel for receiving fasteners for connecting the mounting plate to the vehicle.

BRIEF DESCRIPTION OF THE DRAWINGS

The foregoing and other features of the present invention will become apparent to one skilled in the art upon reading the following description of the present invention with reference to the accompanying drawings, wherein.

DESCRIPTION OF A PREFERRED EMBODIMENT

Figure 1:
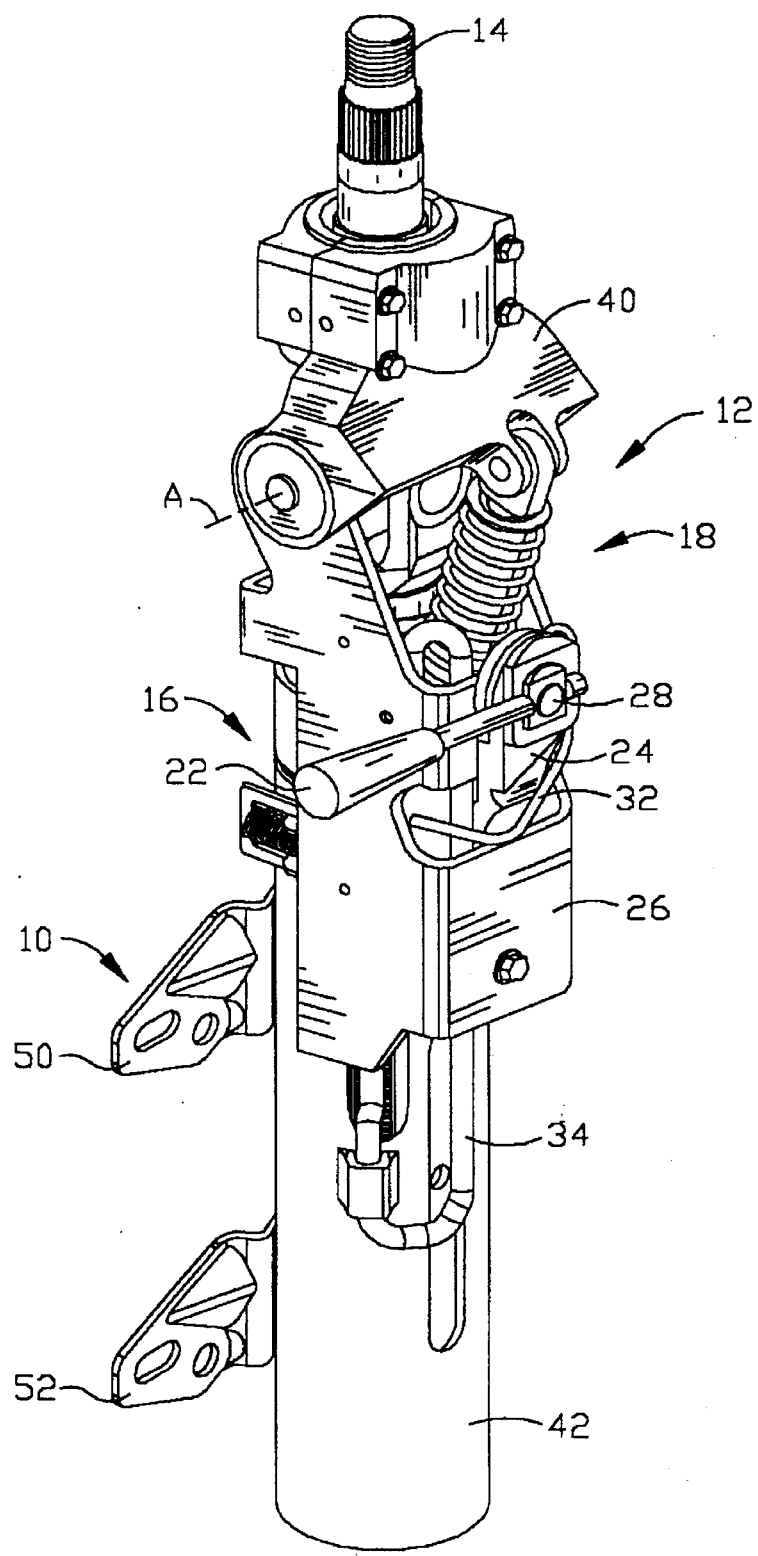
FIG. 1 is a pictorial view of a steering column and support of the present invention for mounting the steering column in a vehicle.

The present invention comprises a steering column support 10 for mounting a steering column 12 in a vehicle. The steering column 12 includes an input shaft 14 to which a vehicle steering wheel (not shown) is attached. The steering column 12 can be telescope to effect axial adjustment of the steering wheel. The input shaft 14 is pivotal about an axis A relative to the steering column 12 to effect angular adjustment of the steering wheel.

A releasable telescope locking mechanism 16 locks the steering column in any one of a plurality of telescope positions. A releasable tilt locking mechanism 18 locks the input shaft 14 in any one of an infinite number of pivot positions. The telescope locking mechanism 16 and the tilt locking mechanism 18 may be of any known construction and, therefore, will not be described in detail.

A handle 22 and actuator member 24, connected to the handle, are pivotally mounted to a bracket 26 by a pin 28. A torsion spring 32 extends around the actuator member 24 to bias the handle 22 and the actuator member to an initial position in which the telescope locking mechanism 16 and the tilt locking mechanism 18 are locked. Upon pivoting the handle 22 and the actuator member 24 in one direction, the actuator member moves a telescope locking member 34 to release the telescope locking mechanism 16. Upon pivoting the handle 22 and the actuator member 24 in another direction, the actuator member unlocks the tilt locking mechanism 18.

The input shaft 14 extends into an upper housing 40. The upper housing 40 is pivotally connected to the bracket 26 which is connected to a jacket tube circumscribing steering column members for transmitting rotation of the input shaft 14 to a steering gear to effect vehicle steering. The upper housing 40 is pivotable about the axis A relative to the bracket 26 and the jacket tube. Therefore, the upper housing 40 pivots along with the input shaft 14 relative to the bracket 26 and the steering column members.

The steering column 12 includes a tubular support member 42 which is connectable to the frame of the vehicle by the steering column support 10. The steering column support 10 includes a pair of identical mounting plates 50 and 52. The mounting plates 50 and 52 are connectable to the support member 42 in any one of a plurality of positions along an axial extent of the support member. The plates 50 and 52 are preferably welded to the tubular support 42 to fixedly connect the plates to the tubular support.

Figure 2:
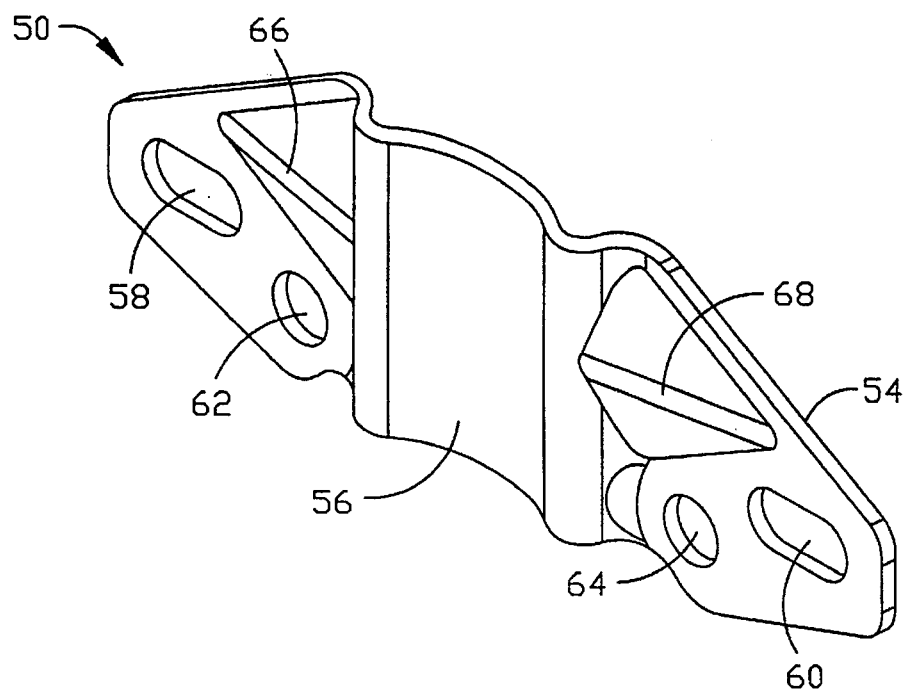
FIG. 2 is an enlarged pictorial view of a mounting plate of the steering column support of FIG. 1.
Figure 3:
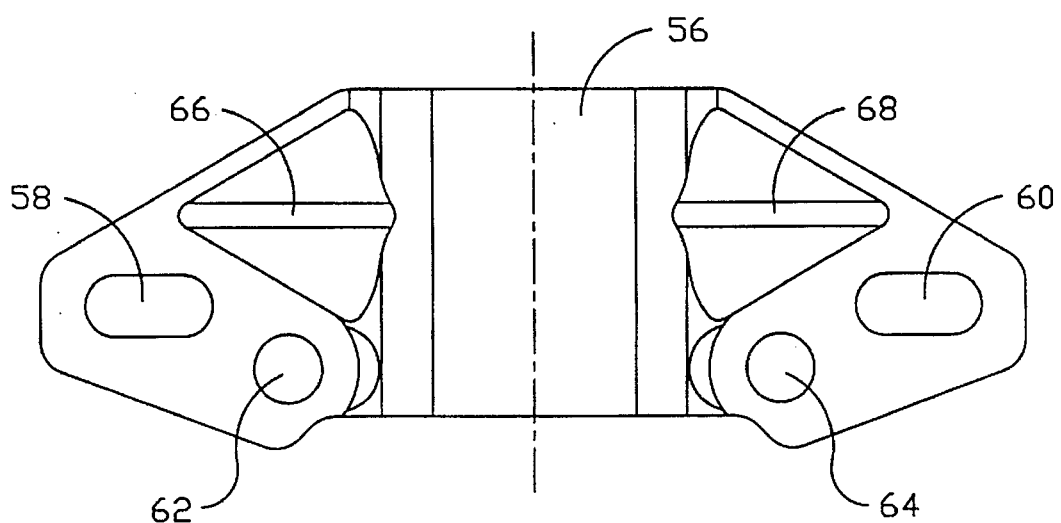
FIG. 3 is a plan view of the mounting plate of FIG. 2.

Since the mounting plates 50 and 52 are identical, only one of the mounting plates 50 will be described in detail. The mounting plate 50 (FIGS. 2 and 3) has a first surface 54 which is engageable with the vehicle frame. The plate 50 includes a part cylindrical channel 56 for receiving the support member 42. A pair of slots 58 and 60 are located on opposite sides of the channel 56 and extend transverse to the axis of the steering column 12 when the plate 50 is connected to the steering column. The slots 58 and 60 receive fasteners for connecting the steering column 12 and mounting plate 50 to the vehicle frame. The slots 58 and 60 are aligned with openings in the vehicle so that the fasteners are positioned at any location along the longitudinal extent of the slots. Accordingly, the plates 50 and 52 have a plurality of positions along the slots in which the plates can be connected to the vehicle.

The mounting plate 50 also includes a pair of circular openings 62 and 64 located on opposite sides of the channel 56. The openings 62 and 64 are axially offset from the slots 58 and 60 for receiving other fasteners for connecting the mounting plate 50 to the vehicle frame. A pair of gussets 66 and 68 are located on opposite sides of the channel 56. The gussets 66 and 68 help support the channel 56.

The plates 50 and 52 may be connected to the support member 42 in any one of a plurality of positions along the axis of the steering column 12. Accordingly, the plates 50 and 52 may be connected to the support member 42 in positions that align with openings in a vehicle frame for connecting the steering column 12 to the vehicle. The openings in the vehicle for receiving fasteners need only align with any portion of the slots 58 and 60 or with the circular openings 62 and 64. Furthermore, any number of mounting plates may be used to connect the steering column 12 to the vehicle. Also, the mounting plates can be used to connect fixed steering columns, tilt only steering columns, and telescope only steering columns to a vehicle.

From the above description of the invention, those skilled in the art will perceive improvements, changes and modifications. Such improvements, changes and modifications within the skill of the art are intended to be covered by the appended claims.

Having described the invention, the following is claimed:

1. A steering column support for mounting a steering column in a vehicle comprising a first mounting plate having first surface means for engaging the vehicle, second surface means for defining a channel for receiving the steering column, said first and second surface means being located on opposite sides of said first mounting plate, said first mounting plate being connectable in any one of a plurality of positions along an axis of the steering column, said first mounting plate further including slots located on opposite sides of said channel for receiving fasteners for connecting said first mounting plate to the vehicle.

2. A steering column support as set forth in claim 1 further including a second mounting plate having first surface means for engaging the vehicle, second surface means for defining a channel for receiving the steering column, said first and second surface means being located on opposite sides of said second mounting plate, said second mounting plate being connectable in any one of a plurality of positions along the axis of the steering column, said second mounting plate further including slots located on opposite sides of said channel for receiving fasteners for connecting said second mounting plate to the vehicle.

3. A steering column support as set forth in claim 1 wherein said slots extend transverse to the axis of the steering column when said first mounting plate is connected to the steering column.

4. A steering column support as set forth in claim 1 wherein said first mounting plate includes gussets located on opposite sides of said channel.

5. A steering column support as set forth in claim 1 wherein said first mounting plate includes circular openings located on opposite sides of said channel for receiving fasteners to connect said mounting plate to the vehicle.

6. A steering column support as set forth in claim 5 wherein said openings are axially offset from said slots in said mounting plate.

7. A steering column support for mounting a steering column in a vehicle comprising first and second mounting plates connectable with the steering column, each of said first and second mounting plates being connectable with the steering column in any one of a plurality of axial positions along the steering column, each of said first and second mounting plates having first surface means for engaging the vehicle and second surface means for defining a channel for receiving the steering column located on a side of said mounting plate opposite from said first surface means, each of said mounting plates having slots located on opposite sides of said channel for receiving fasteners for connecting said mounting plate to the vehicle, said slots extending transverse to the axis of the steering column when said first and second mounting plates are connected to the steering column.

8. A steering column support as set forth in claim 7 wherein each of said first and second mounting plates includes gussets located on opposite sides of said channel.

9. A steering column support as set forth in claim 8 wherein each of said first and second mounting plates includes circular openings located on opposite sides of said channel for receiving fasteners to connect said mounting plates to the vehicle.

10. A steering column support as set forth in claim 9 wherein said openings are offset axially from said slots in each of said first and second mounting plates.

* * * * *